United States Patent
Bao et al.

(10) Patent No.: US 9,800,579 B2
(45) Date of Patent: Oct. 24, 2017

(54) NETWORK-BASED CLIENT SIDE ENCRYPTION

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Peengrove, CA (US); Kevin Flores, San Jose, CA (US); Tushar Chaudhary, Mountain View, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

(21) Appl. No.: 14/620,724

(22) Filed: Feb. 12, 2015

(65) Prior Publication Data

US 2016/0239674 A1 Aug. 18, 2016

(51) Int. Cl.

| G06F 21/62 | (2013.01) |
|---|---|
| H04L 29/06 | (2006.01) |
| G06F 21/60 | (2013.01) |
| H04W 12/02 | (2009.01) |
| H04W 12/04 | (2009.01) |
| H04W 12/06 | (2009.01) |

(52) U.S. Cl.
CPC ........ *H04L 63/0876* (2013.01); *G06F 21/602* (2013.01); *H04L 63/0435* (2013.01); *H04W 12/02* (2013.01); *H04W 12/04* (2013.01); *H04W 12/06* (2013.01); *H04L 2463/061* (2013.01); *H04L 2463/062* (2013.01)

(58) Field of Classification Search
CPC .................... G06F 21/6218; H04L 63/0876
See application file for complete search history.

(56) References Cited

U.S. PATENT DOCUMENTS

| 2006/0168580 | A1* | 7/2006 | Harada | G06F 21/10 |
| | | | | 717/174 |
| 2007/0100913 | A1* | 5/2007 | Sumner | G06F 11/1453 |
| 2007/0143600 | A1* | 6/2007 | Kellil | H04L 9/0822 |
| | | | | 713/163 |
| 2008/0170692 | A1* | 7/2008 | Eastham | H04L 9/0891 |
| | | | | 380/277 |
| 2014/0321641 | A1* | 10/2014 | Khosravi | H04L 63/061 |
| | | | | 380/44 |
| 2016/0119294 | A1* | 4/2016 | Petach | H04L 63/0428 |
| | | | | 713/150 |

* cited by examiner

*Primary Examiner* — Saleh Najjar
*Assistant Examiner* — Devin Almeida

(57) ABSTRACT

A device may provide an upload request to upload a file. The device may receive, based on the upload request, a unique identifier associated with the device. The device may obtain a file key for encrypting the file and a security key for encrypting the file key. The security key may be obtained based on the unique identifier. The device may encrypt the file, using the file key, to create an encrypted file. The device may encrypt the file key, using the security key, to create an encrypted file key. The device may provide the encrypted file and the encrypted file key for storage by a storage device.

20 Claims, 15 Drawing Sheets

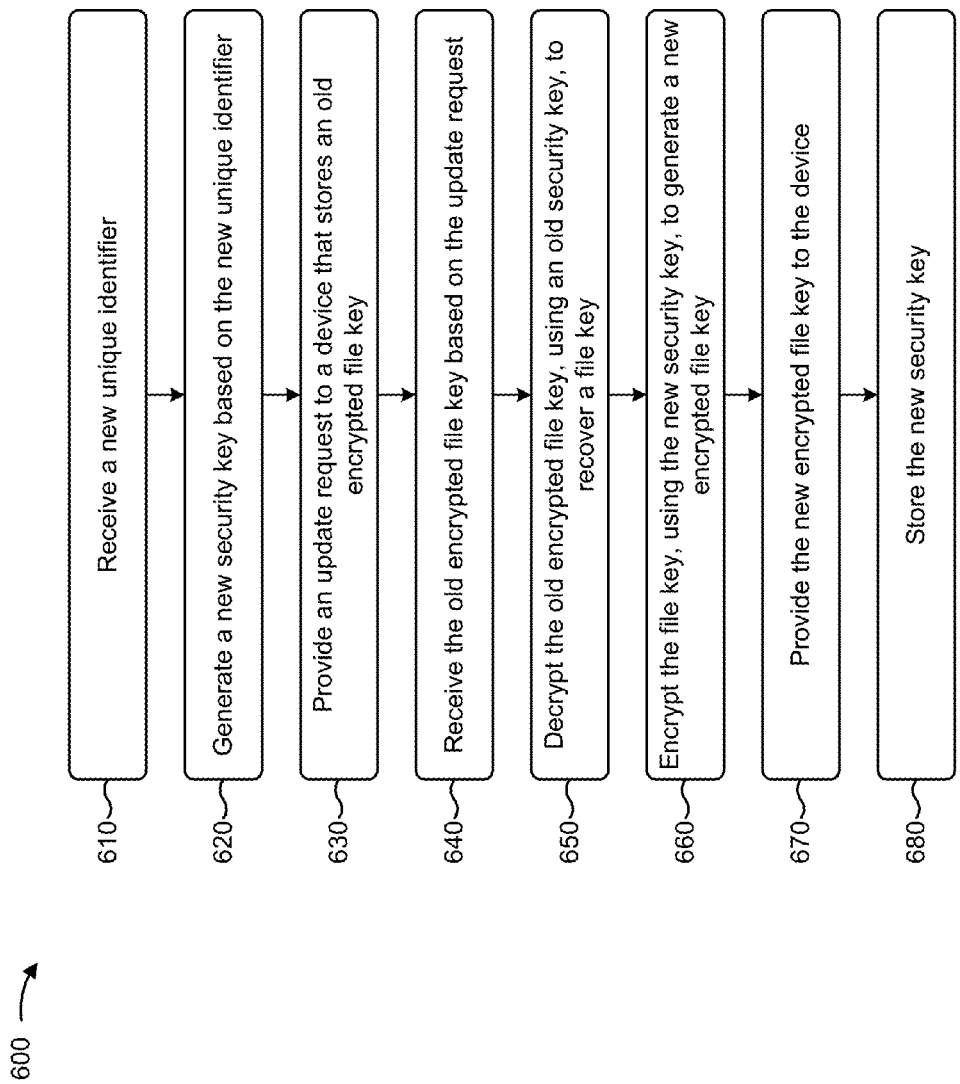

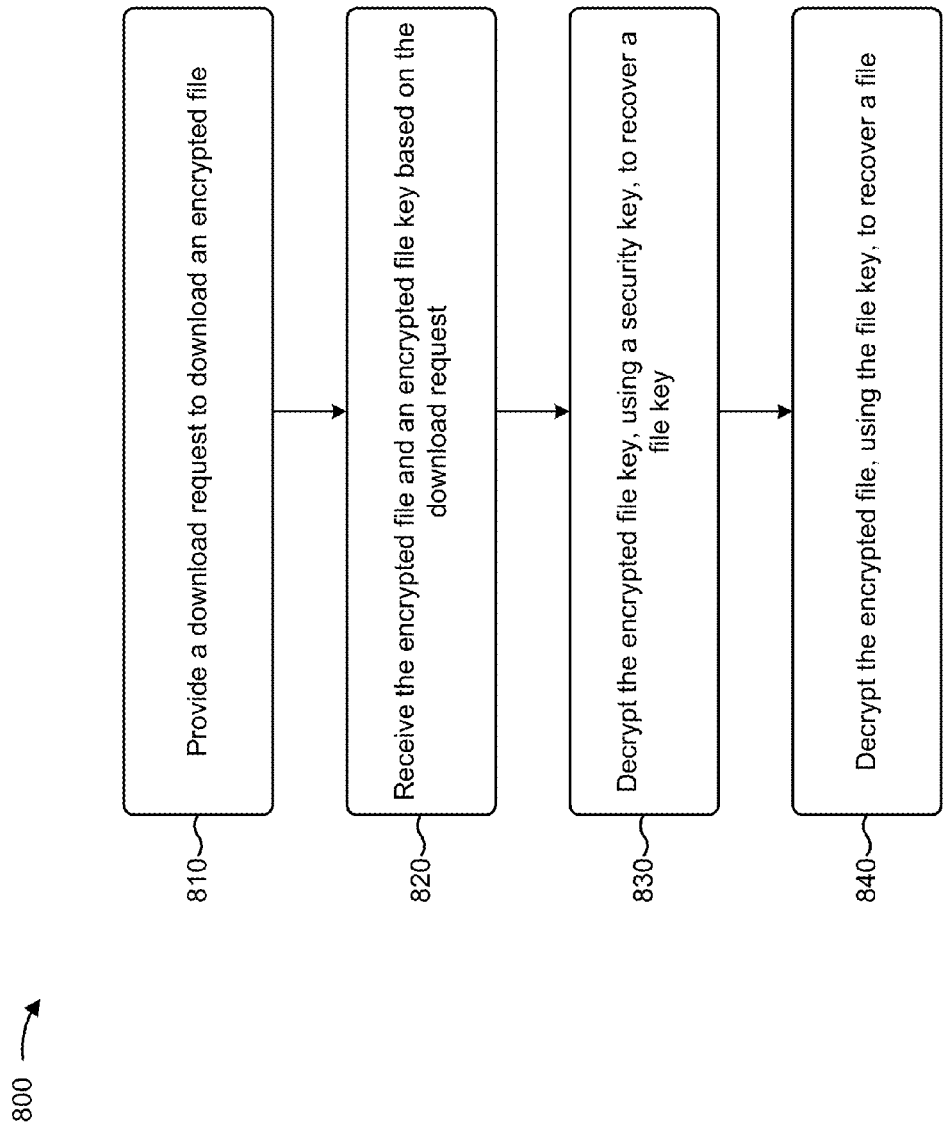

US 9,800,579 B2

NETWORK-BASED CLIENT SIDE ENCRYPTION

BACKGROUND

A client device may provide a file to a storage device for storage (e.g., a cloud storage device, or the like). The client device may encrypt the file before providing the file to the storage device for storage, and may decrypt the file after receiving the file from the storage device.

BRIEF DESCRIPTION OF THE DRAWINGS

FIG. 6 is a flow chart of an example process for updating a stored encrypted file key based on a new unique identifier;

FIG. 8 is a flow chart of an example process for downloading and decrypting an encrypted file and a file key used to encrypt the file.

DETAILED DESCRIPTION OF PREFERRED EMBODIMENTS

The following detailed description of example implementations refers to the accompanying drawings. The same reference numbers in different drawings may identify the same or similar elements.

A service provider may provide a storage service (e.g., a cloud-based storage service). The storage service may receive a file from a client device, store the file on a storage device, and/or provide the file to the client device or another device based on receiving a request for the file. The client device may encrypt the file before providing the file to the storage device, and may decrypt the file after receiving the file from the storage device. The encryption and decryption may be based on a credential provided by a user of the client device (e.g., a password, or the like).

However, the credential provided by the user may be insecure or easily compromised (e.g., the user may share the credential with another entity, may store the credential in an unprotected manner, may use an easily-compromised credential, or the like). Further, the client device may be compromised by a malicious party. Thus, the file associated with the client device may be easily decrypted by a malicious party that determines the credential provided by the user.

Implementations described herein may aid the service provider in improving the security of the stored file. A client device may generate a cryptographic file key, and may encrypt a file using the cryptographic file key to generate an encrypted file. The client device may provide a request to upload the encrypted file. Based on the request, a network device may determine a unique identifier associated with the client device. The network device may provide the unique identifier to the storage device for authentication. The storage device may authenticate the client device and may provide the unique identifier to the client device. The client device may generate a cryptographic security key based on the unique identifier, and may use the cryptographic security key to encrypt the file key to generate an encrypted file key. The client device may provide the encrypted file key to the storage device. In this way, the service provider may improve the security of the stored file, by providing a unique identifier for encryption and/or decryption of the information, rather than relying on a user-provided credential. The client device may further improve security of the stored file by providing the encrypted file key for storage by the storage device, which may be more secure than the client device.

Figure 1A:
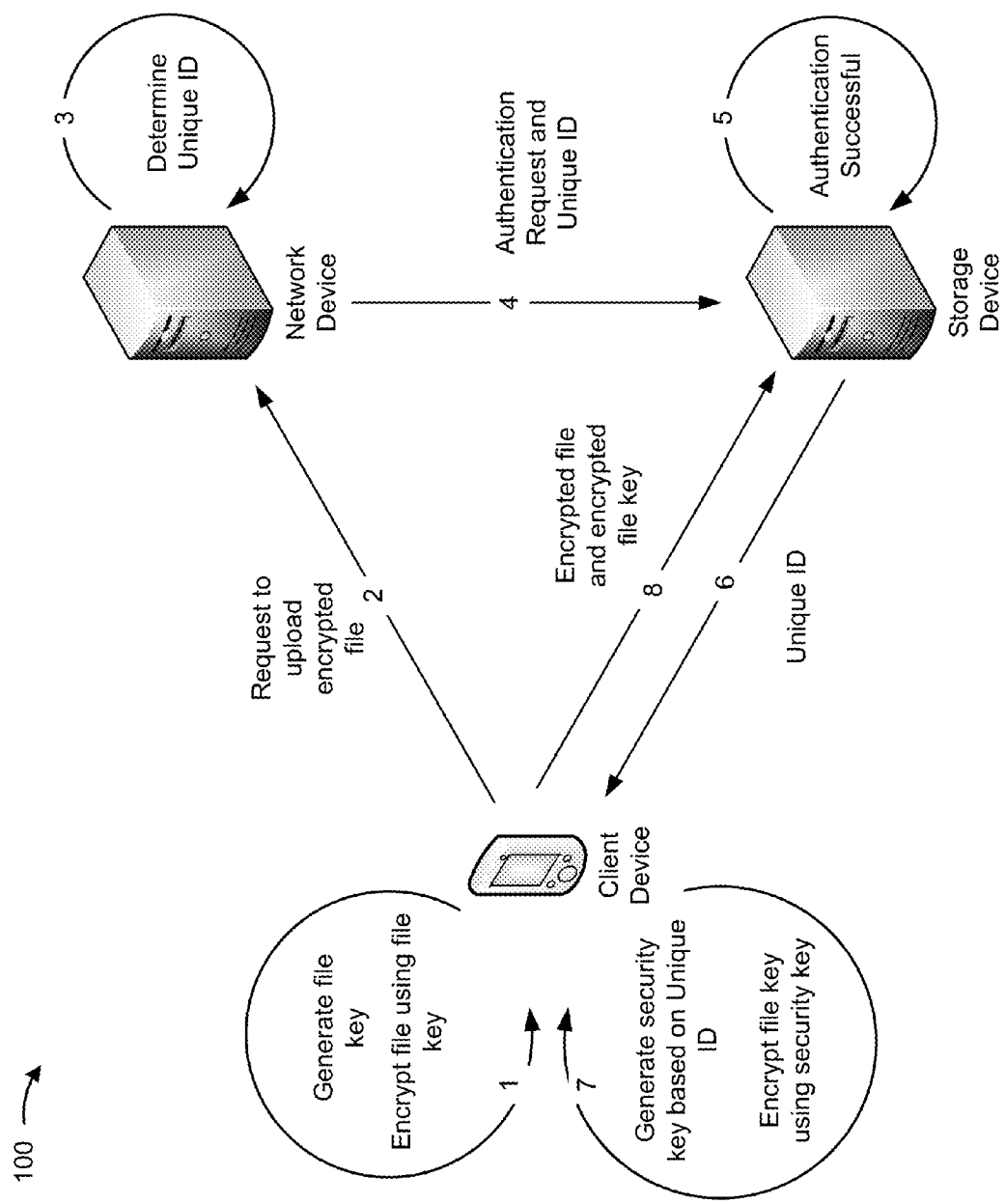
FIGS. 1A and 1B are diagrams of an overview of an example implementation described herein.
Figure 1B:
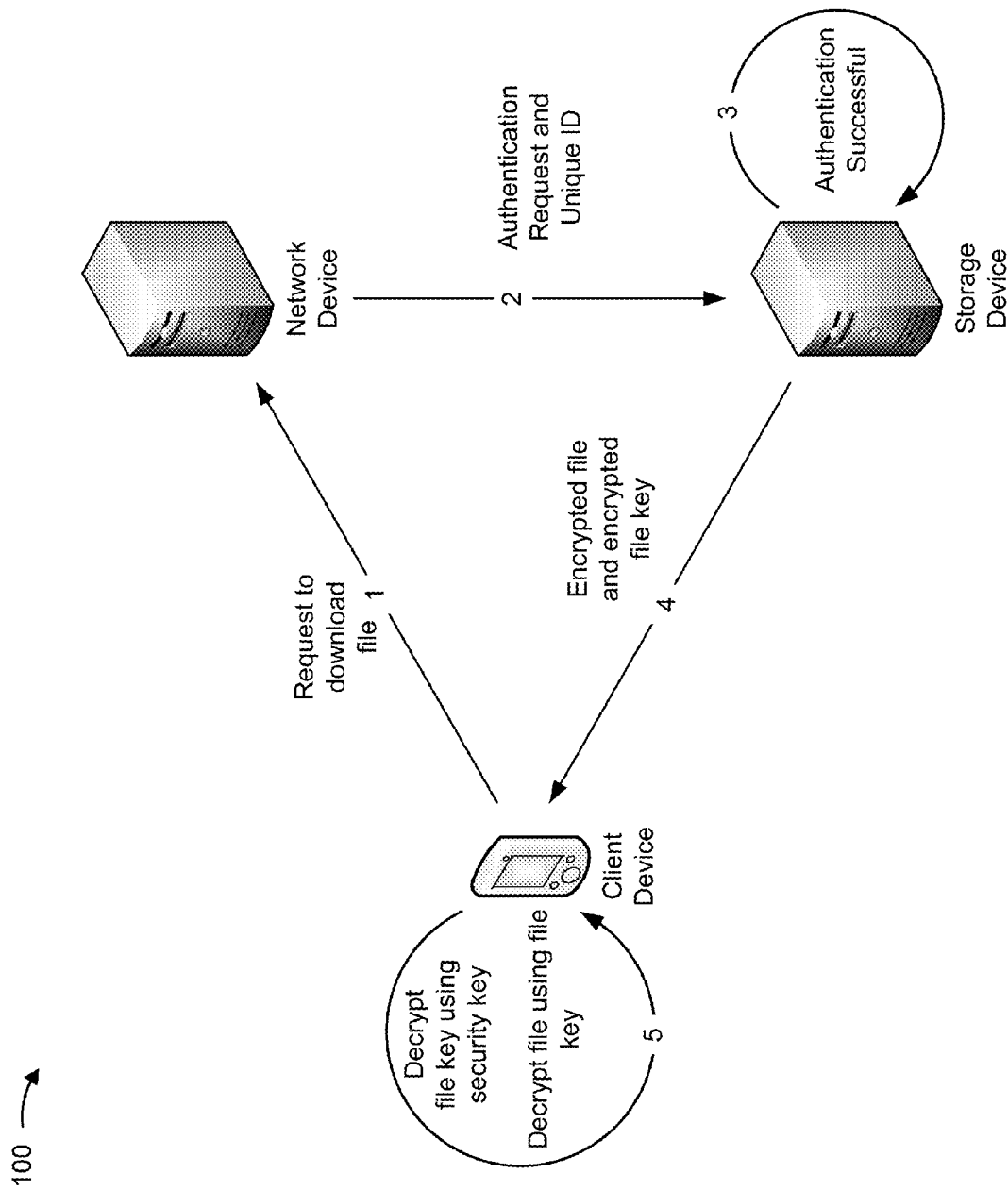

FIGS. 1A and 1B are diagrams of an overview of an example implementation 100 described herein. As shown in FIG. 1A, a client device may generate a file key (e.g., a random string of one or more characters). As further shown, the client device may encrypt a file using the file key to generate an encrypted file. As shown, the client device may provide, to a network device, a request to upload the encrypted file. As further shown, the network device may determine a unique identifier associated with the client device. As shown, the network device may provide, to a storage device, an authentication request that includes the unique identifier. As further shown, the storage device may authenticate the client device and/or the unique identifier based on the authentication request. As shown, the storage device may provide the unique identifier to the client device upon successfully authenticating the client device and/or the unique identifier.

As shown, the client device may generate a security key based on the unique identifier. As further shown, the client device may encrypt the file key, using the security key, to create an encrypted file key. As shown, the client device may provide, to the storage device, the encrypted file and the encrypted file key. Assume that the storage device stores the encrypted file and the encrypted file key. Assume further that the client device retains the security key.

As shown in FIG. 1B, the client device may provide, to the network device, a request to download the encrypted file. As further shown, the network device may determine the unique identifier associated with the client device, and may provide an authentication request, that includes the unique identifier, to the storage device. As shown, the storage device may authenticate the client device and/or the unique identifier based on the authentication request. As further shown, the storage device may provide, to the client device associated with the unique identifier, the encrypted file key and the encrypted file upon successfully authenticating the client device and/or the unique identifier.

As further shown, the client device may decrypt the encrypted file key, using the security key, to recover the file key. As shown, the client device may decrypt the encrypted file, using the file key, to recover the file. In this way, the client device may use the storage device to store the encrypted file. The client device may encrypt and decrypt the file using a security key that is generated based on a unique identifier that is not provided by a user of the client device, which may improve security of the encrypted file. The user of the client device may not be required to provide additional credentials to encrypt the file, which may improve the user experience.

Figure 2:
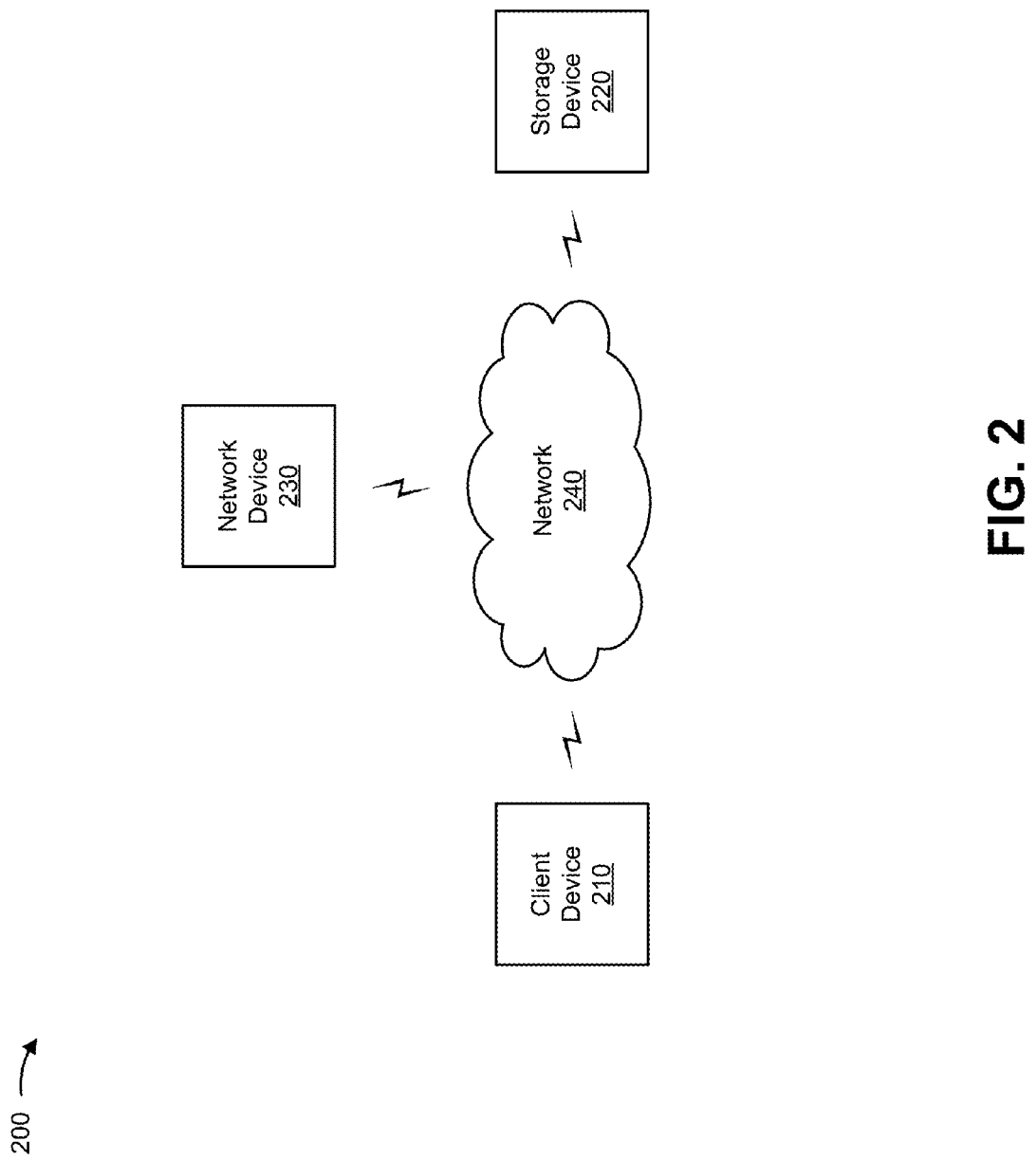
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a storage device 220, a network device 230, and a network 240. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart watch, a pair of smart eyeglasses, etc.), or a similar type of device. In some implementations, client device 210 may provide a message (e.g., an upload request, a download request, an update request, or the like) to storage device 220 and/or network device 230. In some implementations, client device 210 may provide a file and a credential to and/or receive a file and a credential from storage device 220.

Storage device 220 may include one or more devices capable of receiving, generating, storing, processing, and/or providing information. For example, storage device 220 may include a server, a cloud storage device, or a similar device. In some implementations, storage device 220 may provide storage (e.g., cloud storage) for files provided by another device, such as client device 210. In some implementations, storage device 220 may provide a stored file and a credential to client device 210 or another device (e.g., based on a download request). In some implementations, storage device 220 may authenticate a unique identifier, and may provide the unique identifier to client device 210 (e.g., based on receiving, from network device 230, an authentication request that includes the unique identifier).

Network device 230 may include one or more devices capable of receiving, storing, generating, processing, and/or providing security information. For example, network device 230 may include a firewall, a server (e.g., a web server), or a similar device. In some implementations, network device 230 may provide and/or control access to storage device 220 (e.g., by client device 210). For example, network device 230 may receive an upload request and/or a download request (e.g., from client device 210) to upload a file to or download a file from storage device 220. Network device 230 may determine a unique identifier associated with client device 210, and may provide the unique identifier in association with an authentication request to storage device 220, to cause storage device 220 to authenticate the unique identifier and/or provide the unique identifier to client device 210.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
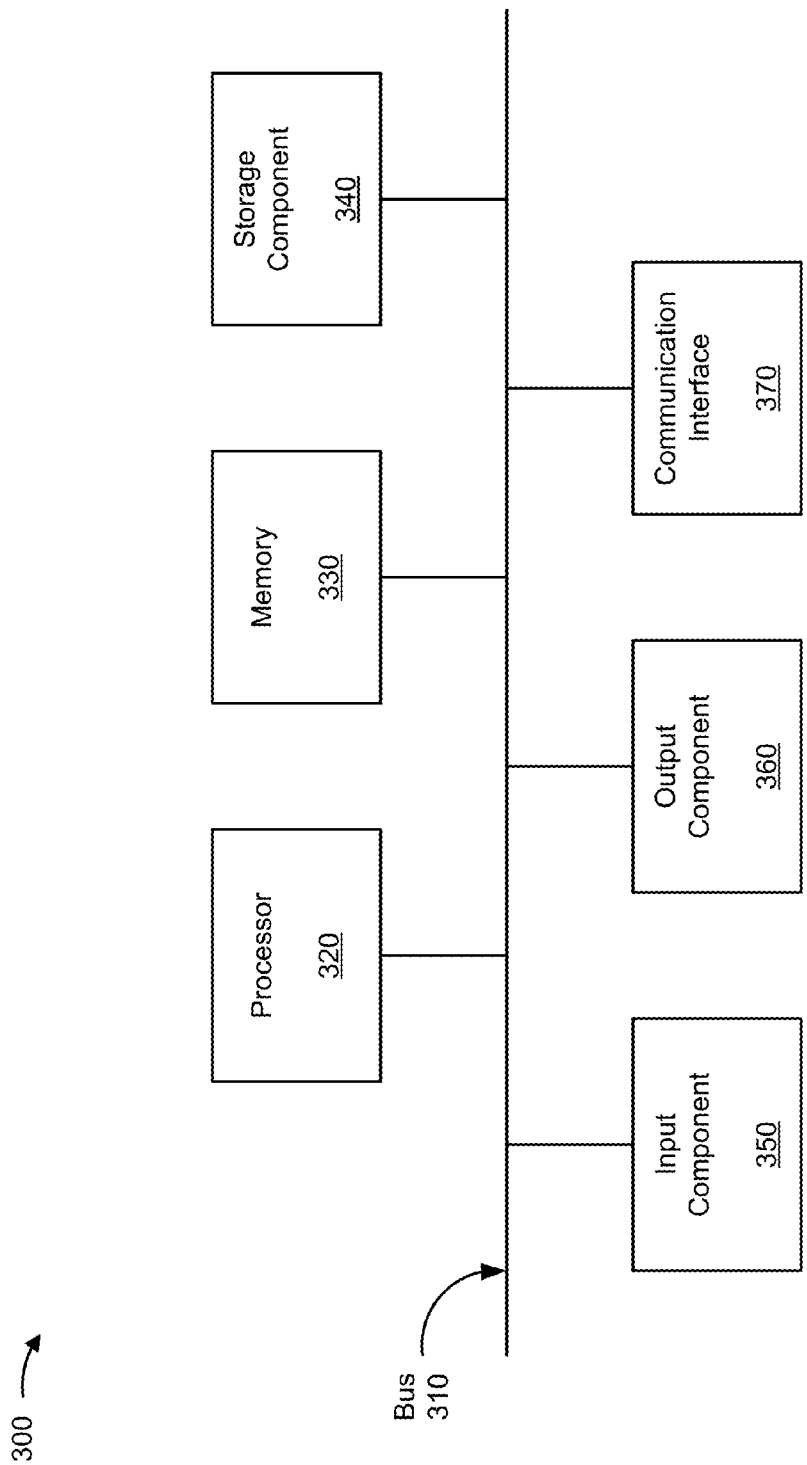
FIG. 3 is a diagram of example components of one or more devices of FIG. 2.

FIG. 3 is a diagram of example components of a device 300. Device 300 may correspond to client device 210, storage device 220, and/or network device 230. In some implementations, client device 210, storage device 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
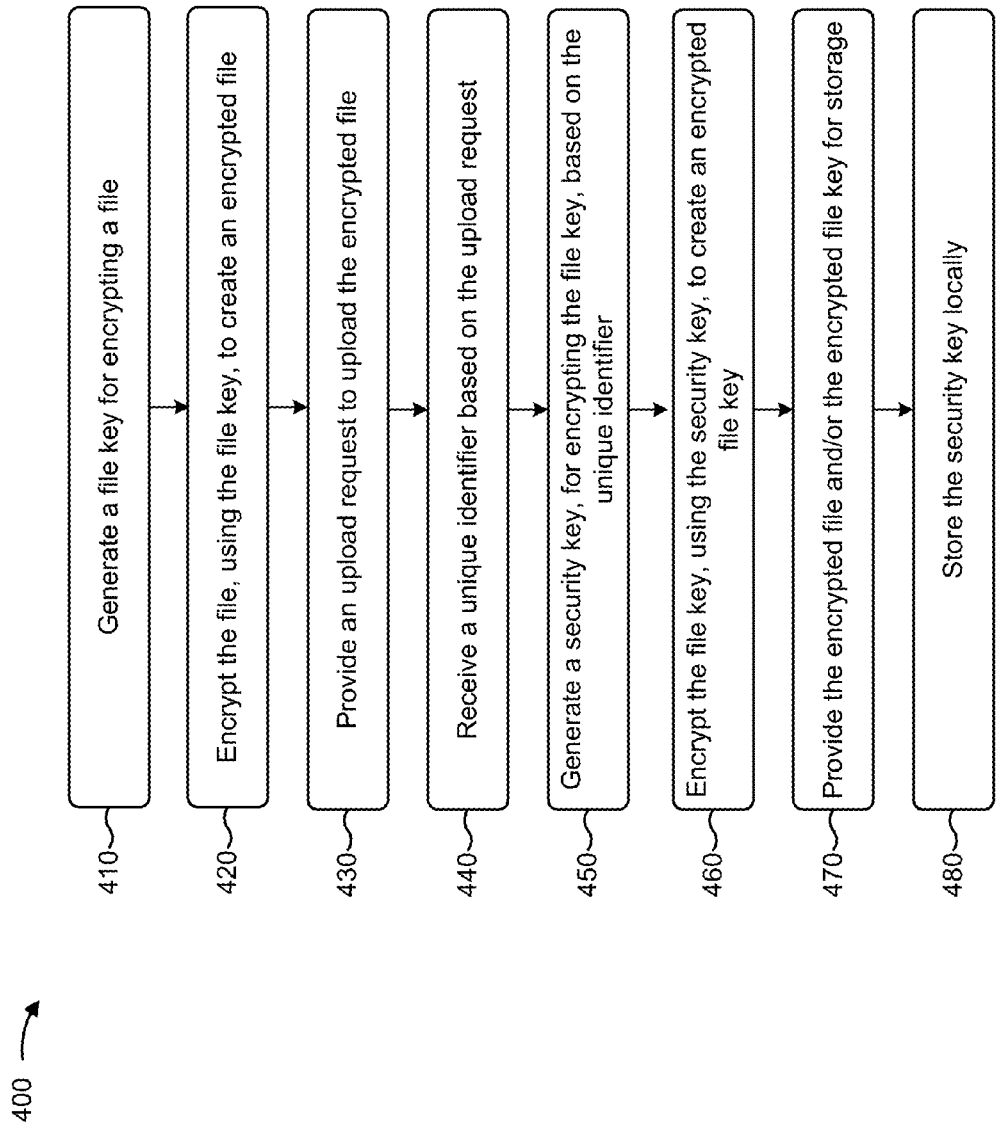
FIG. 4 is a flow chart of an example process for encrypting and uploading a file and a credential used to encrypt the file.

FIG. 4 is a flow chart of an example process 400 for encrypting and uploading a file and a credential used to encrypt the file. In some implementations, one or more process blocks of FIG. 4 may be performed by client device 210. In some implementations, one or more process blocks of FIG. 4 may be performed by another device or a set of devices separate from or including client device 210, such as storage device 220 and/or network device 230.

As shown in FIG. 4, process 400 may include generating a file key for encrypting a file (block 410). For example, client device 210 may generate a file key (e.g., a cryptographic key, or the like). In some implementations, client device 210 may use the file key to encrypt a file and/or to decrypt an encrypted file. In some implementations, the file key may be a random string of characters.

As further shown in FIG. 4, process 400 may include encrypting the file, using the file key, to create an encrypted file (block 420). For example, client device 210 may encrypt the file, using the file key, to create an encrypted file. In some implementations, client device 210 may encrypt the file using an encryption algorithm (e.g., an Advanced Encryption Standard (AES) algorithm, an RSA algorithm, an MD5 algorithm, or the like) that utilizes the file key.

As shown in FIG. 4, process 400 may include providing an upload request to upload the encrypted file (block 430). For example, client device 210 may provide, to network device 230, an upload request. The upload request may request to upload an encrypted file (e.g., a file encrypted by, stored by, and/or accessible by client device 210). In some implementations, the upload request may include information that identifies client device 210.

In some implementations, the upload request may include a device identifier associated with client device 210 (e.g., a mobile directory number (MDN), an international mobile subscriber identity (IMSI), an international mobile station equipment identity (IMEI), a mobile equipment identifier (MEID), or the like, that identifies client device 210), a file type identifier that identifies a type of file to upload (e.g., a file extension associated with the file, a format of the file, etc.), or the like.

In some implementations, the upload request may cause network device 230 to determine a unique identifier. The unique identifier may be a string of one or more characters associated with client device 210. For example, the unique identifier may include a unique identifier header (UIDH). In some implementations, the unique identifier may be associated with network traffic that is received from, transmitted toward, and/or associated with client device 210 (e.g., in a header of the network traffic, to identify the network traffic as associated with client device 210, or the like). In some implementations, the unique identifier may include information that identifies client device 210. For example, the unique identifier may include information that identifies a type of client device 210, information that identifies a user of client device 210, information that identifies a service that client device 210 is authorized to access, information that describes a geographical location of client device 210, or the like.

In some implementations, the unique identifier may be a device identifier that identifies client device 210. For example, network device 230 may receive the device identifier from client device 210 (e.g., in association with the upload request) and may use the device identifier as a unique identifier associated with client device 210. Additionally, or alternatively, network device 230 may receive the device identifier from another device (e.g., a home subscriber server, an authentication authorization and accounting server, or the like).

In some implementations, the unique identifier may be different than the device identifier. As an example, network device 230 may generate the unique identifier. In some implementations, network device 230 may generate the unique identifier based on the device identifier (e.g., by applying an algorithm to the device identifier, or the like). As another example, network device 230 may assign the unique identifier from a list of unused unique identifiers that are generated by network device 230 prior to receiving the upload request, or the like. In some implementations, network device 230 may use the device identifier to determine the unique identifier. For example, network device 230 may look up a unique identifier based on the device identifier. Additionally, or alternatively, network device 230 may provide the device identifier to another device, which may provide a unique identifier to network device 230 based on receiving the device identifier.

In some implementations, the upload request may cause network device 230 to provide the upload request, an authentication request, and/or a unique identifier to storage device 220. For example, after receiving an upload request from client device 210, network device 230 may determine a unique identifier associated with client device 210. Network device 230 may further provide an authentication request that includes the unique identifier and/or the upload request to storage device 220, to cause storage device 220 to authenticate client device 210 (e.g., to determine if client device 210 is permitted to upload the file, to ensure that client device 210 is genuine, to ensure that client device 210 is not stolen, or the like). In this way, network device 210 may improve security of storage device 220 by requesting authentication of client device 210 before providing the unique identifier to client device 210.

In some implementations, storage device 220 may provide the unique identifier to client device 210 based on a result of authenticating client device 210. As an example, assume that storage device 220 successfully authenticates client device 210. Based on successfully authenticating client device 210, storage device 220 may provide the unique identifier to client device 210. As another example, assume that client device 210 has been stolen or compromised (e.g., has been hacked). Assume further that authentication information associated with client device 210 indicates that client device 210 has been stolen or compromised. Based on the authentication information, storage device 220 may fail to authenticate client device 210. Based on failing to authenticate client device 210, storage device 220 may not provide the unique identifier to client device 210 (e.g., to prevent a malicious party from accessing the unique identifier, to prevent a malicious party from accessing an encrypted file associated with client device 210, or the like). In this way, storage device 220 may prevent a malicious party from gaining access to encrypted files associated with client device 210.

In some implementations, the upload request may be provided by a first application associated with client device 210. For example, assume that client device 210 is associated with a first application and a second application. In some implementations, the first application may provide an upload request to upload a file associated with the first application. In some implementations, the second application may provide a download request to download the file, as described in more detail elsewhere herein. In this way, client device 210 may support cross-platform functionality, as described in more detail elsewhere herein.

As further shown in FIG. 4, process 400 may include receiving a unique identifier based on the upload request (block 440). For example based on receiving an upload request, network device 230 may determine a unique identifier associated with client device 210. Network device 230 may provide the unique identifier, the upload request, and/or an authentication request to storage device 220. Storage device 220 may successfully authenticate client device 210, and may provide the unique identifier to client device 210 based on successfully authenticating client device 210. In some implementations, client device 210 may receive the unique identifier via a secure session (e.g., a hypertext transfer protocol secure (HTTPS) session, or the like).

In some implementations, storage device 220 may provide the unique identifier to client device 210 based on a result of authenticating client device 210. As an example, assume that storage device 220 successfully authenticates client device 210. Based on successfully authenticating client device 210, storage device 220 may provide the unique identifier to client device 210. As another example, assume that client device 210 has been stolen or compromised (e.g., has been hacked). Assume further that authentication information associated with client device 210 indicates that client device 210 has been stolen or compromised. Based on the authentication information, storage device 220 may fail to authenticate client device 210. Based on failing to authenticate client device 210, storage device 220 may not provide the unique identifier to client device 210 (e.g., to prevent a malicious party from accessing the unique identifier, to prevent a malicious party from accessing an encrypted file associated with client device 210, or the like). In this way, storage device 220 may prevent a malicious party from gaining access to encrypted files associated with client device 210.

As further shown in FIG. 4, process 400 may include generating a security key, for encrypting the file key, based on the unique identifier (block 450). For example, client device 210 may generate a security key (e.g., a cryptographic key, a private key, or the like) based on the unique identifier. In some implementations, client device 210 may apply a hashing algorithm to the unique identifier, and may use a resulting hash value as a security key. In some implementations, client device 210 may generate the security key based on receiving the unique identifier. For example, client device 210 may generate the security key when the unique identifier is received from storage device 220.

As further shown in FIG. 4, process 400 may include encrypting the file key, using the security key, to create an encrypted file key (block 460). For example, client device 210 may encrypt the file key, using the security key, to create an encrypted file key. In some implementations, client device 210 may encrypt the file key using an encryption algorithm (e.g., an AES algorithm, an RSA algorithm, an MD5 algorithm, or the like) that utilizes the security key. The encrypted file key may be decrypted by client device 210 when decrypting the encrypted file, as described in more detail elsewhere herein.

As further shown in FIG. 4, process 400 may include providing the encrypted file and/or the encrypted file key for storage (block 470). For example, client device 210 may provide (e.g., upload), to storage device 220, the encrypted file and/or the encrypted file key. In some implementations, client device 210 may provide the unique identifier in association with the encrypted file and/or the encrypted file key, to aid storage device 220 in identifying the encrypted file, the encrypted file key, and/or client device 210. In some implementations, the encrypted file and/or the encrypted file key may be provided via a secure session (e.g., an HTTPS session, or the like). In this way, client device 210 may encrypt a file key based on a unique identifier provided by network device 230, and may provide the encrypted file and the encrypted file key for storage to storage device 220, which may improve security of the file by eliminating the need for the user to provide a credential used to encrypt the file (e.g., the unique identifier may be used as the credential). Client device 210 may further improve security of the file by providing the encrypted file and the encrypted file key to storage device 220, rather than storing the encrypted file and the encrypted file key locally.

In some implementations, a first application associated with client device 210 may provide the encrypted file and the encrypted file key. For example, assume that client device 210 is associated with a first application and a second application. Assume further that the first application provided an upload request to network device 230. In that case, the first application may provide the encrypted file and the encrypted file key to storage device 220. In some implementations, the second application may provide the download request and/or may receive the encrypted file and/or the encrypted file key, as described in more detail elsewhere herein. In this way, implementations described herein may provide cross-platform functionality for client-side encryption.

In some implementations, client device 210 may not store the file key locally (e.g., may delete the file key from memory). For example, assume that client device 210 encrypts the file based on the file key, and encrypts the file key based on the security key. Rather than storing the file key locally (e.g., for decrypting the encrypted file), client device 210 may delete the file key. In some implementations, client device 210 may later generate the file key by decrypting the encrypted file key using the security key. In this way, client device 210 may improve security of the encrypted file by not storing the file key locally, which may prevent a malicious party from decrypting the file after accessing client device 210.

As further shown in FIG. 4, process 400 may include storing the security key locally (block 480). For example, client device 210 may store the security key locally. In some implementations, client device 210 may use the security key to decrypt an encrypted file key received from storage device 220, as described in more detail elsewhere herein. In this way, client device 220 may improve security of the encrypted file by storing the encrypted file key and the security key on different devices.

In some implementations, client device 210 may not store the security key locally. For example, assume that client device 210 encrypts the file key based on the security key. Rather than storing the security key locally (e.g., for decrypting the encrypted file key), client device 210 may delete the security key. In some implementations, client device 210 may later generate the security key based on the unique identifier. In this way, client device 210 may improve security of the encrypted file by not storing the security key locally, which may prevent a malicious party that accesses client device 210 from determining the security key.

In some implementations, client device 210 may provide the security key. For example, client device 210 may provide the security key to another device (e.g., another client device 210, or the like). In some implementations, client device 210 may provide the security key to the other device via a secure channel (e.g., a secure session, an encrypted session, or the like). Additionally, or alternatively, client device 210 may provide the security key to the other device using a physical medium (e.g., a computer-readable medium, or the like). The other device may use the security key to decrypt the encrypted file key, and may use the file key to decrypt the encrypted file. In some implementations, a user of client device 210 may provide the security key (e.g., via user input) to one or more other client devices 210 to enable the other client device(s) 210 to encrypt and/or decrypt a file key and/or a file. In this way, client device 210 may support cross-platform functionality by providing a security key to another device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
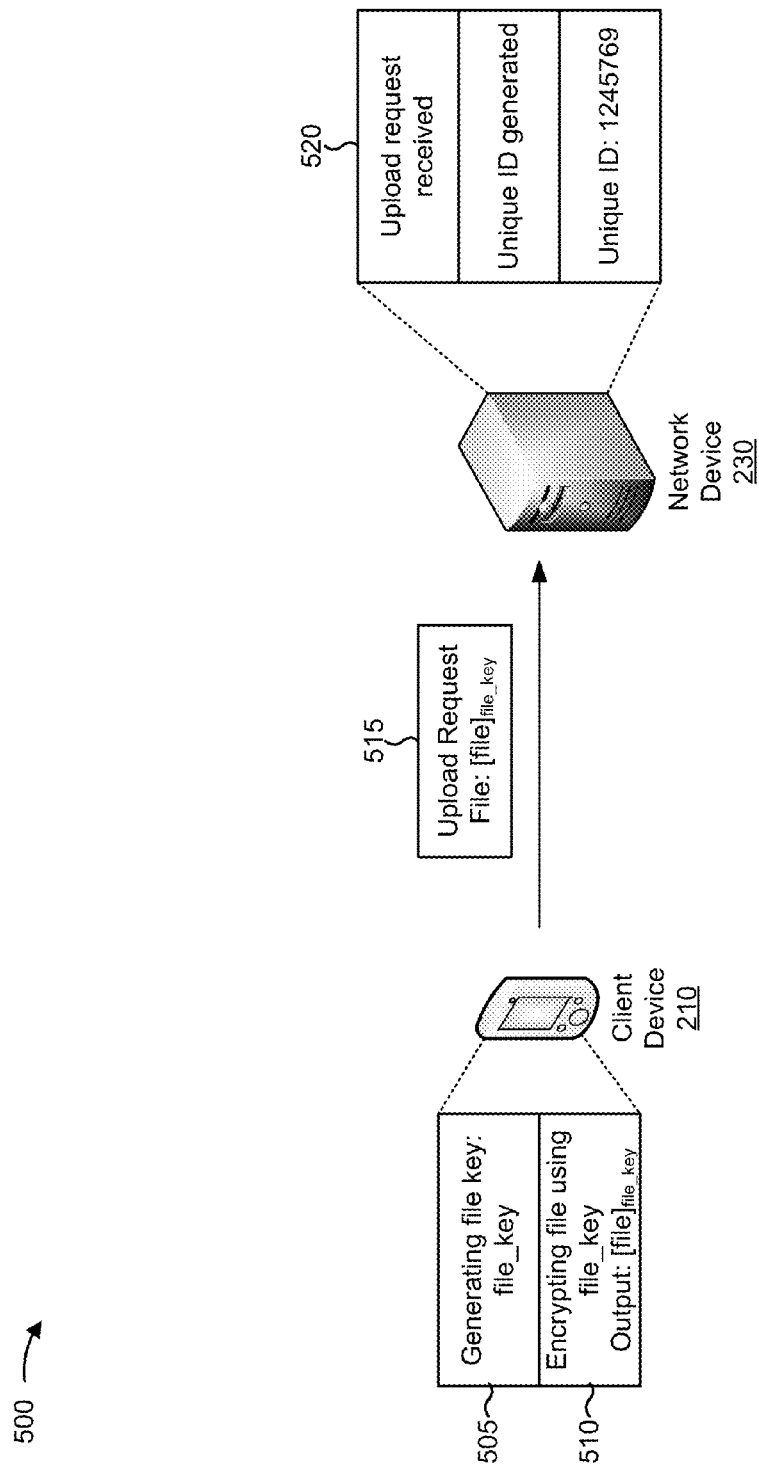
FIGS. 5A-5C are diagrams of an example implementation relating to the example process shown in FIG. 4.
Figure 5B:
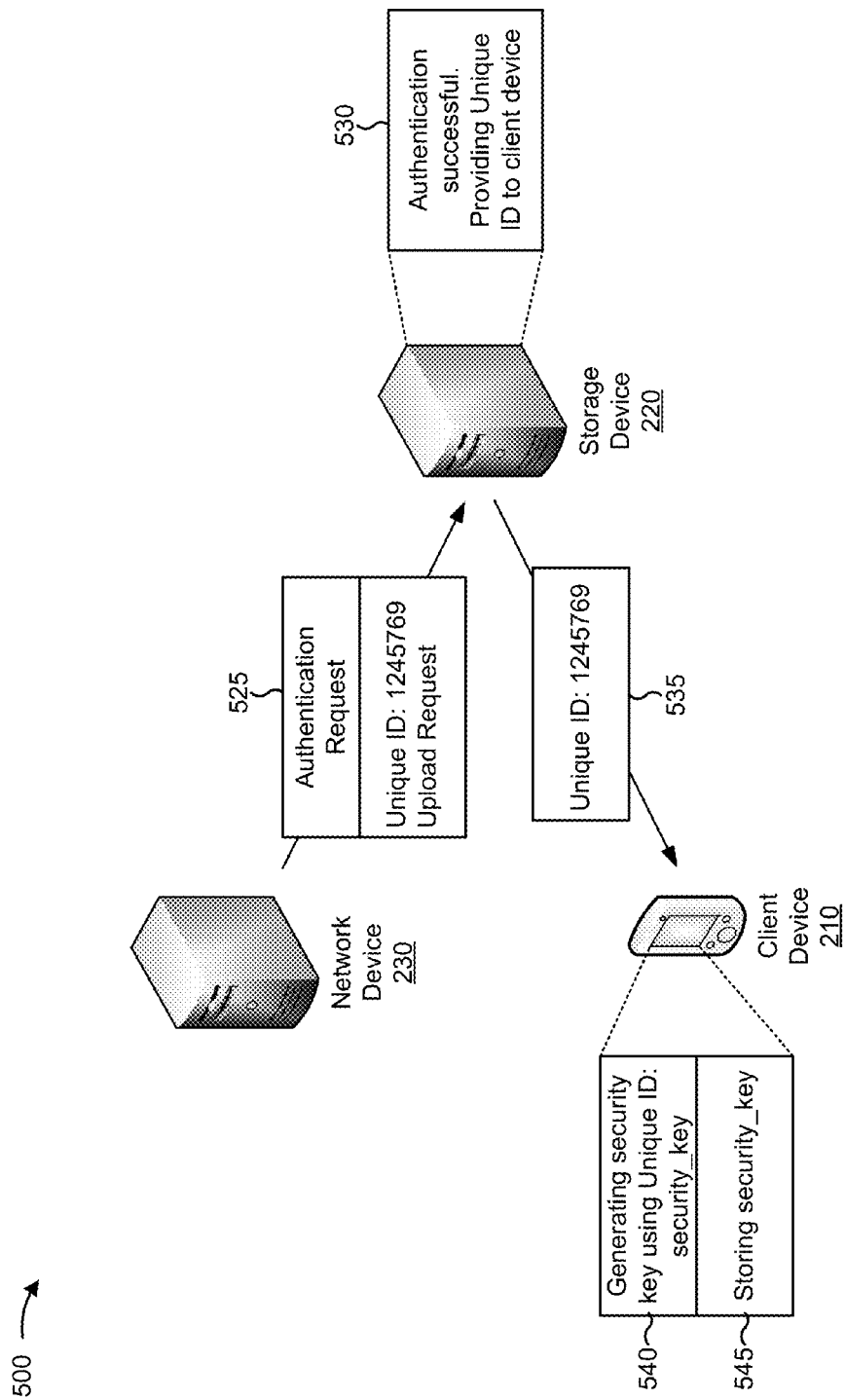
Figure 5C:
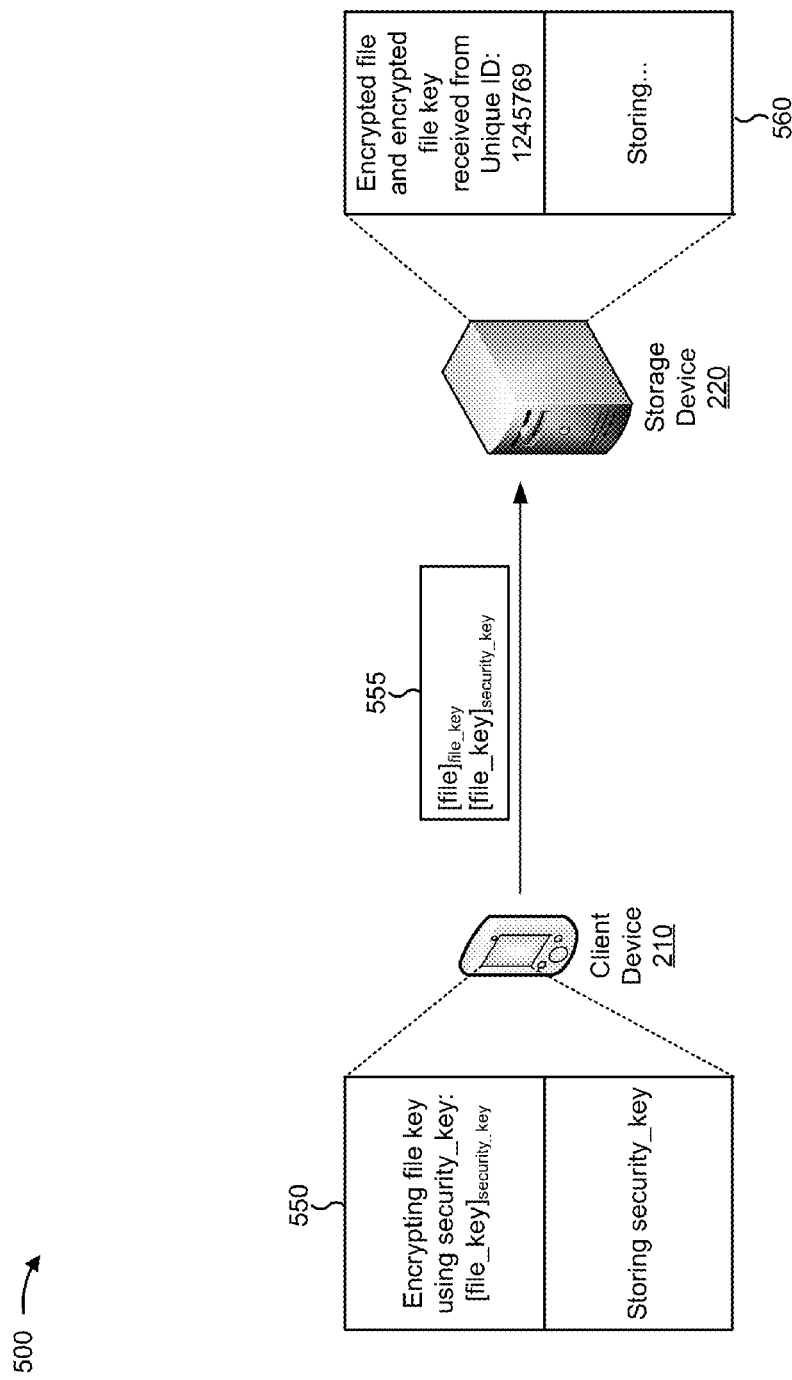

FIGS. 5A-5C are diagrams of an example implementation 500 relating to example process 400 shown in FIG. 4. FIGS. 5A-5C show an example of encrypting and uploading a file and a credential used to encrypt the file.

As shown in FIG. 5A, and by reference number 505, client device 210 may generate a file key (e.g., shown as file_key) for encrypting a file before uploading the file to storage device 220. Assume that client device 210 generates the file key by generating a string of random characters and using the string of random characters as the file key. As shown by reference number 510, client device 210 may encrypt the file, using the file key, to generate an encrypted file (e.g., shown as [file]$_{file\_key}$). Assume that client device 210 applies an AES encryption algorithm to the file, using the file key, to create the encrypted file.

As further shown in FIG. 5A, and by reference number 515, client device 210 may provide, to network device 230, an upload request. As further shown, the upload request may include information that identifies the file (e.g., shown as [file]$_{file\_key}$). As shown by reference number 520, network device 230 may receive the upload request. As further shown, network device 230 may generate a unique identifier (e.g., shown as a Unique ID of 1245769) associated with client device 210.

As shown in FIG. 5B, and by reference number 525, network device 230 may provide, to storage device 220, an authentication request. As further shown, the authentication request may include the upload request and the unique ID of 1245769 As shown by reference number 530, storage device 220 may authenticate the unique ID of 1245769 As shown by reference number 535, based on successfully authenticating the unique identifier, storage device 220 may provide the unique ID of 1245769 to client device 210 (e.g., may provide the unique ID of 1245769 to client device 210, rather than a different device, based on the unique ID being associated with client device 210).

As shown by reference number 540, client device 210 may create a security key based on the unique identifier (e.g., shown as security_key). Assume that client device 210 generates the security key by applying a hashing algorithm to the unique identifier and using a resulting hash value as the security key. As shown by reference number 545, client device 210 may store the security key locally.

As shown in FIG. 5C, and by reference number 550, client device 210 may encrypt the file key based on the security key to create an encrypted file key (e.g., shown as [file key]$_{security\_key}$). Assume that client device 210 applies an AES algorithm to the file key, using the security key, to create the encrypted file key. As shown by reference number 555, client device 210 may provide, to storage device 220, the encrypted file and the encrypted file key. As shown by reference number 560, storage device 220 may receive and store the encrypted file and the encrypted file key. As described herein, client device 210 may encrypt the file based on the file key, and may encrypt the file key based on the security key. Client device 210 may provide the encrypted file key and the encrypted file, and may locally store the security key. In this way, client device 210 may prevent a malicious party from decrypting the encrypted file (e.g., by storing the file key and the security key on different devices, and by requiring authentication to determine the unique identifier used to encrypt the file key).

As indicated above, FIGS. 5A-5C are provided merely as an example. Other examples are possible and may differ from what was described with regard to FIGS. 5A-5C.

FIG. 6 is a flow chart of an example process 600 for updating a stored encrypted file key based on a new unique identifier. In some implementations, one or more process blocks of FIG. 6 may be performed by client device 210. In some implementations, one or more process blocks of FIG. 6 may be performed by another device or a set of devices separate from or including client device 210, such as storage device 220 and/or network device 230.

As shown in FIG. 6, process 600 may include receiving a new unique identifier (block 610). For example, client device 210 may receive, from storage device 220 or network device 230, a new unique identifier. Client device 210 may receive the new unique identifier periodically (e.g., every week, every month, or the like). In some implementations, client device 210 may receive the new unique identifier based on an interaction. For example, another device, such as storage device 220, may cause network device 230 to provide the new unique identifier. In some implementations, network device 230 may generate the new unique identifier. Additionally, or alternatively, network device 230 may receive the new unique identifier from another device, such as a home subscriber server device, an authentication authorization and accounting device, or the like. In some implementations, client device 210 may receive the new unique identifier via a secure session (e.g., an HTTPS session, or the like).

Client device 210 may receive the new unique identifier in order to facilitate updating the encryption of the encrypted file key. By updating the encryption of the encrypted file key, client device 210 may improve the security of the encrypted file. For example, assume that a malicious party determines an old security key associated with client device 210. Assume further that client device 210 has provided, to storage device 220, a new encrypted file key based on a new security key. The malicious party may be unable to decrypt the new encrypted file key, despite determining the old security key. In this way, client device 210 may improve the security of the encrypted file.

In some implementations, the new unique identifier may include information that is included in a unique identifier, as described above in connection with FIG. 4. For example, the new unique identifier may include information that identifies a type of client device 210, information that identifies a user of client device 210, information that identifies a service that client device 210 is authorized to access, information that describes a geographical location of client device 210, or the like. In some implementations, the new unique identifier may include information that identifies the new unique identifier as a new unique identifier (e.g., a version identifier, or the like).

As further shown in FIG. 6, process 600 may include generating a new security key based on the new unique identifier (block 620). For example, client device 210 may generate a new security key based on the new unique identifier. In some implementations, client device 210 may generate the new security key by using the new unique identifier in a similar manner as described in connection with block 450 of FIG. 4. The new security key may be used to generate a new encrypted file key after decrypting an old encrypted file key using an old security key. In this way, client device 210 may improve security of the encrypted file by periodically creating a new encrypted file key based on a new security key.

As further shown in FIG. 6, process 600 may include providing an update request to a device that stores an old encrypted file key (block 630). For example, client device 210 may provide an update request to storage device 220, based on storage device 220 storing an old encrypted file key. The old encrypted file key may be an encrypted file key previously encrypted and provided by client device 210. In some implementations, the update request may include the old unique identifier. Storage device 220 may use the old unique identifier to identify the encrypted file key associated with client device 210.

In some implementations, client device 210 may provide the update request without user input (e.g., automatically). For example, assume that client device 210 receives a new unique identifier. Client device 210 may provide an update request to storage device 220 based on receiving the new unique identifier. In this way, client device 210 may ensure that the encrypted file key is updated as the unique identifier is updated, which may improve security of the encrypted file.

As further shown in FIG. 6, process 600 may include receiving the old encrypted file key based on the update request (block 640). For example, storage device 220 may determine the old encrypted file key based on the update request, and may provide the old encrypted file key to client device 210. Client device 210 may receive the old encrypted file key based on the update request.

As further shown in FIG. 6, process 600 may include decrypting the encrypted file key, using an old security key, to recover a file key (block 650). For example, client device 210 may decrypt the old encrypted file key using an old security key (e.g., the old security key may be a security key used by client device 210 to encrypt the old encrypted file key), to recover a file key. The file key may be used to encrypt a file and/or decrypt an encrypted file, as described in more detail elsewhere herein. In some implementations, client device 210 may decrypt the old encrypted file key using a decryption algorithm (e.g., an AES algorithm, an RSA algorithm, an MD5 algorithm, or the like) that utilizes the old security key.

As further shown in FIG. 6, process 600 may include encrypting the file key, using the new security key, to generate a new encrypted file key (block 660). For example, client device 210 may encrypt the file key, based on the new security key, to generate a new encrypted file key. The new encrypted file key generated by client device 210 may be different than the old encrypted file key received by client device 210 (e.g., the old encrypted file key may be encrypted based on the old security key, whereas the new encrypted file key may be encrypted based on the new security key). In some implementations, client device 210 may encrypt the file key using an encryption algorithm (e.g., an AES algorithm, an RSA algorithm, an MD5 algorithm, or the like) that utilizes the new security key.

As further shown in FIG. 6, process 600 may include providing the new encrypted file key to the device (block 670). For example, client device 210 may provide the new encrypted file key to storage device 220 for storage. In some implementations, client device 210 may provide the new encrypted file key via a secure session (e.g., an HTTPS session, or the like). In some implementations, client device 210 may provide the new unique identifier in association with the new encrypted file key. Storage device 220 may associate the new encrypted file key and the new unique identifier, which may aid storage device 220 in identifying the new encrypted file key. In some implementations, storage device 220 may delete the old encrypted file key and/or may replace the old encrypted file key with the new encrypted file key. In this way, client device 210 may improve security of the encrypted file, by periodically generating new encrypted file keys and providing the new encrypted file keys to storage device 220.

As further shown by FIG. 6, process 600 may include storing the new security key (block 680). For example, client device 210 may store the new security key. In some implementations, client device 210 may use the new security key to decrypt a new encrypted file key, as described in more detail elsewhere herein. In some implementations, client device 210 may delete the old security key and/or may replace the old security key with the new security key. In this way, client device 210 may update the encrypted file key based on the new unique identifier, which may improve security of the encrypted file by ensuring that a malicious party that determines an old encrypted file key is incapable of decrypting the encrypted file.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
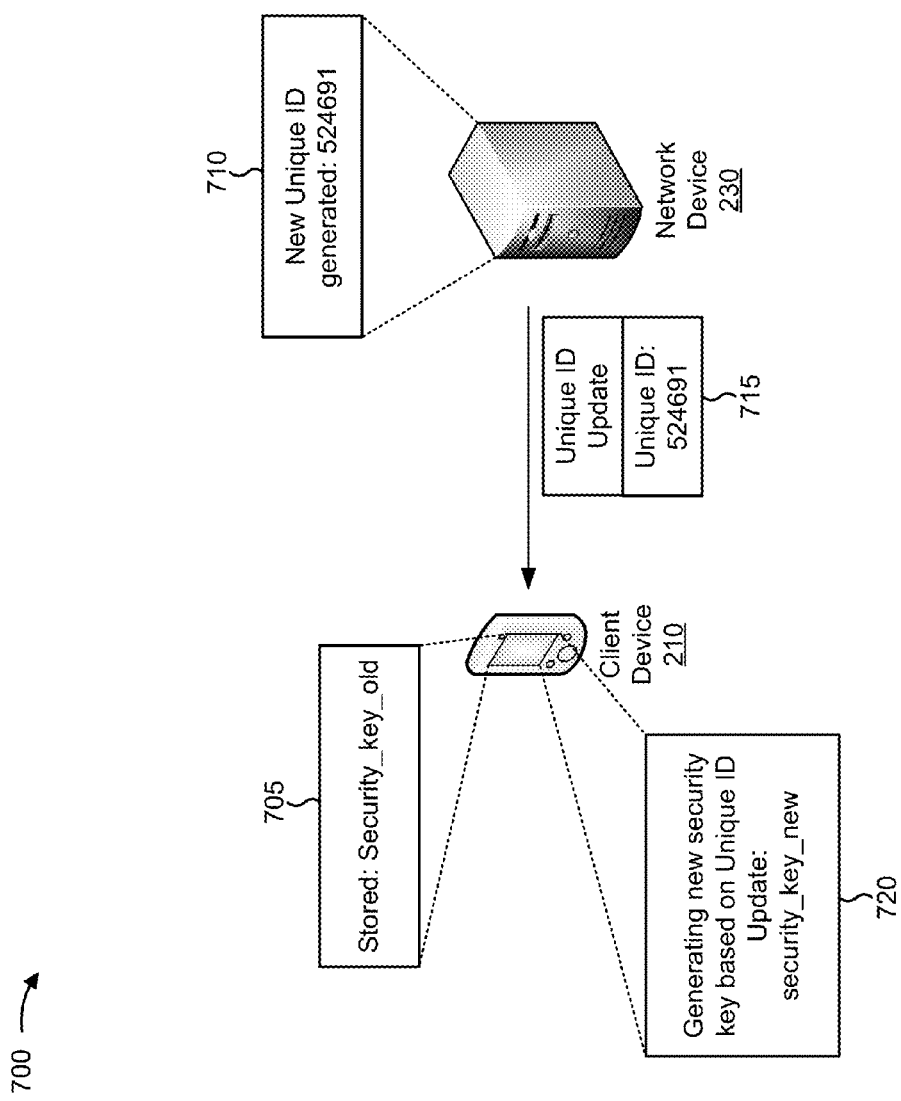
FIGS. 7A-7C are diagrams of an example implementation relating to the example process shown in FIG. 6.
Figure 7B:
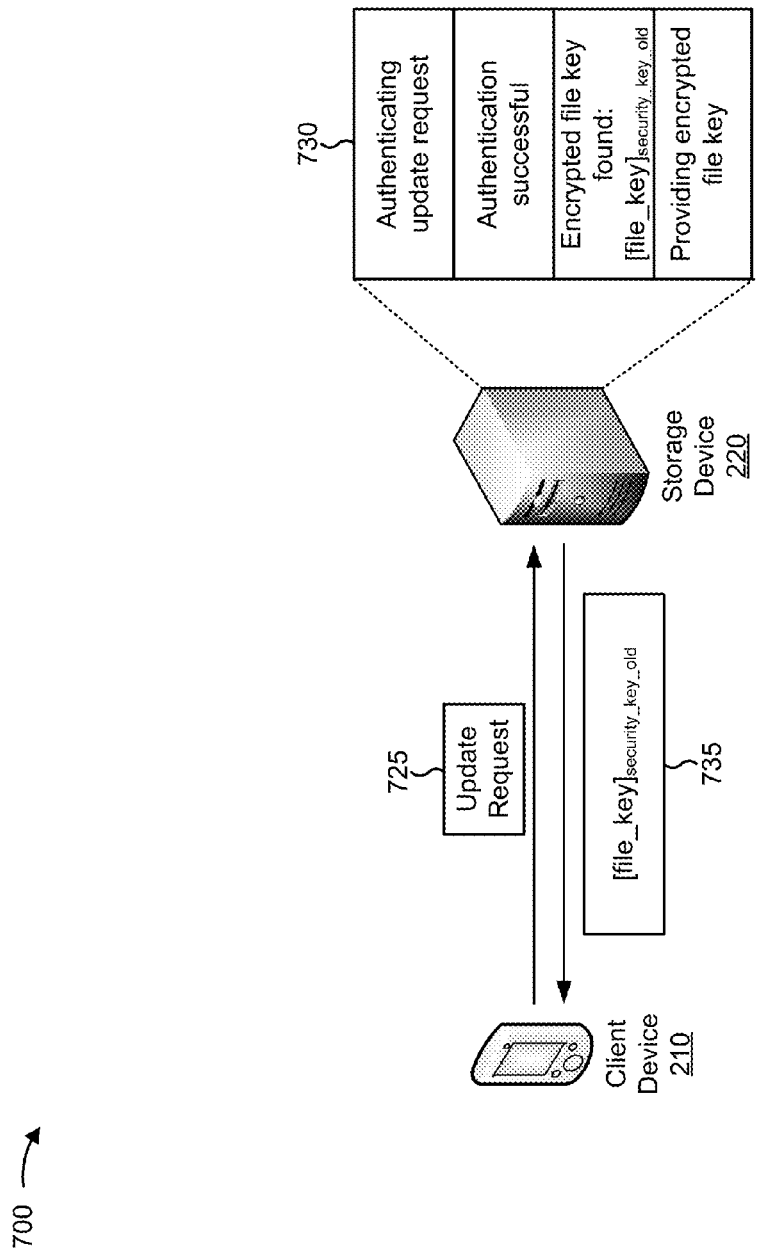
Figure 7C:
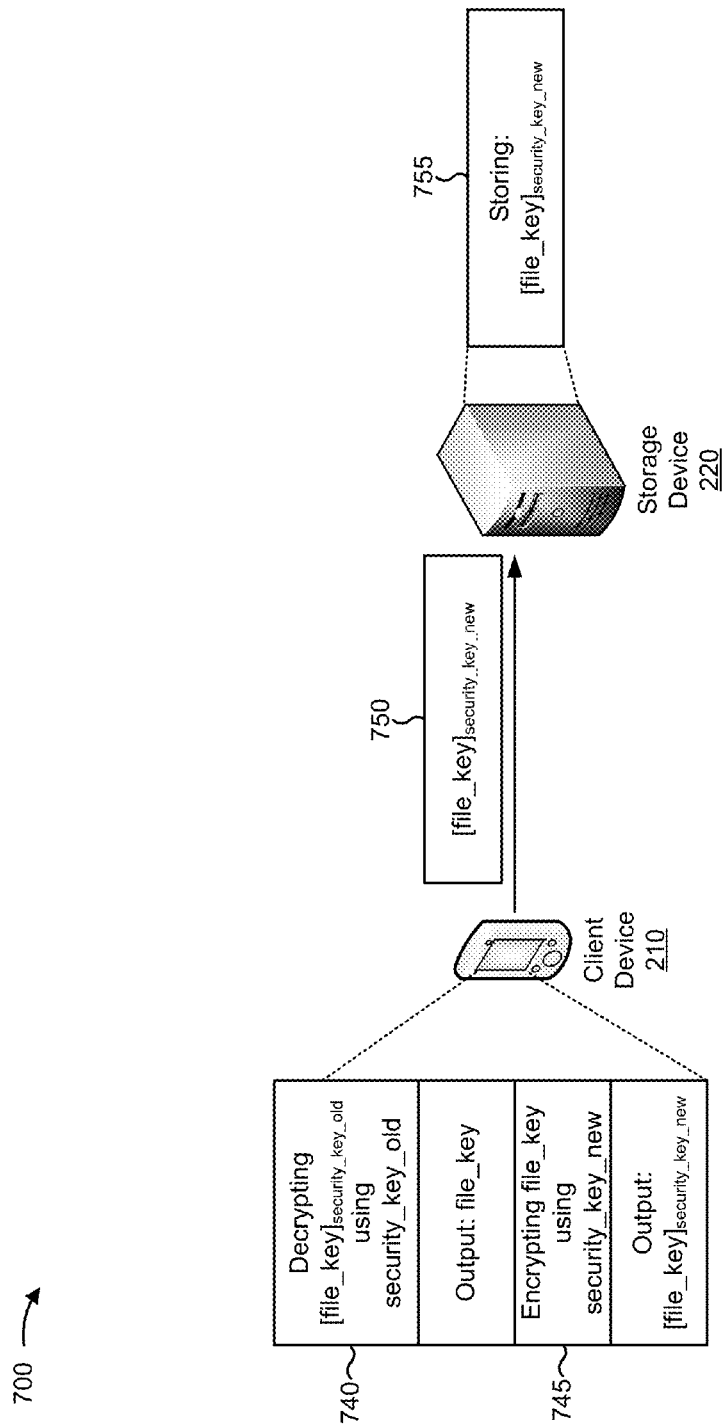

FIGS. 7A-7C are diagrams of an example implementation 700 relating to example process 600 shown in FIG. 6. FIGS. 7A-7C show an example of updating a stored security key based on a new unique identifier. For the purposes of FIGS. 7A-7C, assume that the operations described herein in connection with FIGS. 5A-5C have been performed.

As shown in FIG. 7A, and by reference number 705, client device 210 may store an old security key (e.g., security_key_old), which may correspond to the security key stored by client device 210 as shown in FIG. 5C. As shown by reference number 710, network device 230 may generate a new unique identifier that identifies client device 210 (e.g., a new Unique ID of 524691). As shown by reference number 715, network device 230 may provide the new unique identifier to client device 210 (e.g., in a "Unique ID Update" message that includes the new unique identifier). Assume that client device 210 receives the new unique identifier. As shown by reference number 720, client device 210 may generate a new security key based on the new unique identifier (e.g., shown as security_key_new). Assume that client device 210 continues to store the old security key.

As shown in FIG. 7B, and by reference number 725, client device 210 may provide an update request to storage device 220, requesting to update an old encrypted file key stored by storage device 220. Assume that client device 210 provides the update request based on receiving the new unique identifier. As shown by reference number 730, storage device 220 may authenticate the update request. Assume that storage device 220 successfully authenticates the update request. As shown by reference number 735, based on successfully authenticating the update request, storage device 220 may provide the old encrypted file key (e.g., shown as [file key]$_{security\_key\_old}$). Assume that the old encrypted file key is associated with client device 210.

As shown in FIG. 7C, and by reference number 740, client device 210 may decrypt the old encrypted file key using the old security key (e.g., based on the old encrypted file key being encrypted using the old security key) to recover the file key (e.g., shown as file_key). As shown by reference number 745, client device 210 may encrypt the file key using the new security key to generate a new encrypted file key (e.g., shown as [file key]$_{security\_key\_new}$).

As further shown in FIG. 7C, and by reference number 750, client device 210 may provide the new encrypted file key to storage device 220. As shown by reference number 755, storage device 220 may store the new encrypted file key. In some implementations, storage device 220 may delete the old encrypted file key. Additionally, or alternatively, client device 210 may delete the old security key. In this way, client device 210 may update an encrypted file key stored by storage device 220, which may improve security of a file encrypted using the encrypted file key.

As indicated above, FIGS. 7A-7C are provided merely as an example. Other examples are possible and may differ from what was described with regard to FIGS. 7A-7C.

FIG. 8 is a flow chart of an example process 800 for downloading and decrypting an encrypted file and a file key used to encrypt the file. In some implementations, one or more process blocks of FIG. 8 may be performed by client device 210. In some implementations, one or more process blocks of FIG. 8 may be performed by another device or a set of devices separate from or including client device 210, such as storage device 220 and/or network device 230.

As shown in FIG. 8, process 800 may include providing a download request to download an encrypted file (block 810). For example, client device 210 may provide a download request to network device 230. The download request may request that storage device 220 provide the encrypted file and/or the encrypted file key. In some implementations, client device 210 may provide the download request via a secure session (e.g., an HTTPS session, or the like).

In some implementations, network device 230 may generate an authentication request based on the download request. For example, based on receiving the download request, network device 230 may generate an authentication request to cause storage device 220 to authenticate client device 210. In some implementations, network device 230 may provide the authentication request to storage device 220.

In some implementations, the download request may be provided by a different application than an application that provided an upload request. For example, assume that client device 210 is associated with a first application and a second application. Assume further that a first application uploaded an encrypted file. In some implementations, the second application may provide a download request (e.g., to cause storage device 220 to provide the encrypted file to client device 210). In this way, client device 210 may support cross-platform functionality by providing the encrypted file via the first application and receiving the encrypted file via the second application.

As further shown in FIG. 8, process 800 may include receiving the encrypted file and an encrypted file key based on the download request (block 820). For example, client device 210 may receive, from storage device 220, an encrypted file and an encrypted file key based on the download request. In some implementations, client device 210 may receive the encrypted file and/or the encrypted file key based on the unique identifier associated with client device 210. For example, based on the unique identifier, storage device 220 may determine a device identifier associated with client device 210, and may provide the encrypted file and/or the encrypted file key to client device 210 based on the device identifier. In some implementations, client device 210 may receive the encrypted file and the encrypted file key via a secure session (e.g., an HTTPS session, or the like).

As further shown in FIG. 8, process 800 may include decrypting the encrypted file key, using a security key, to recover a file key (block 830). For example, client device 210 may decrypt the encrypted file key, using a security key, to recover a file key. In some implementations, client device 210 may store the security key locally. In some implementations, client device 210 may decrypt the encrypted filing key using a decryption algorithm (e.g., an AES algorithm, an RSA algorithm, an MD5 algorithm, or the like) that utilizes the security key. In some implementations, the security key may be the security key used to encrypt the encrypted file key, as described herein in connection with FIG. 4 and FIG. 6.

In some implementations, client device 210 may decrypt the encrypted file key using a received security key. For example, client device 210 may receive a security key from another device (e.g., another client device 210) via a secure channel, a physical medium, user input, or the like. Client device 210 may use the security key to decrypt the encrypted file key. In this way, client device 210 may support cross-platform functionality by using a received security key to decrypt an encrypted file key.

As further shown in FIG. 8, process 800 may include decrypting the encrypted file, using the file key, to recover a file (block 840). For example, client device 210 may decrypt the encrypted file, using the file key, to recover a file. In some implementations, client device 210 may decrypt the encrypted file using a decryption algorithm (e.g., an AES algorithm, an RSA algorithm, an MD5 algorithm, or the like) that utilizes the file key.

In this way, client device 210 may decrypt an encrypted file key using a security key, and may decrypt an encrypted file using the decrypted file key to create a decrypted file that was originally encrypted by client device 210. By storing the security key and the encrypted file key on different devices, and by generating the security key based on a unique identifier provided by network device 230, client device 210 may improve security of the file.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
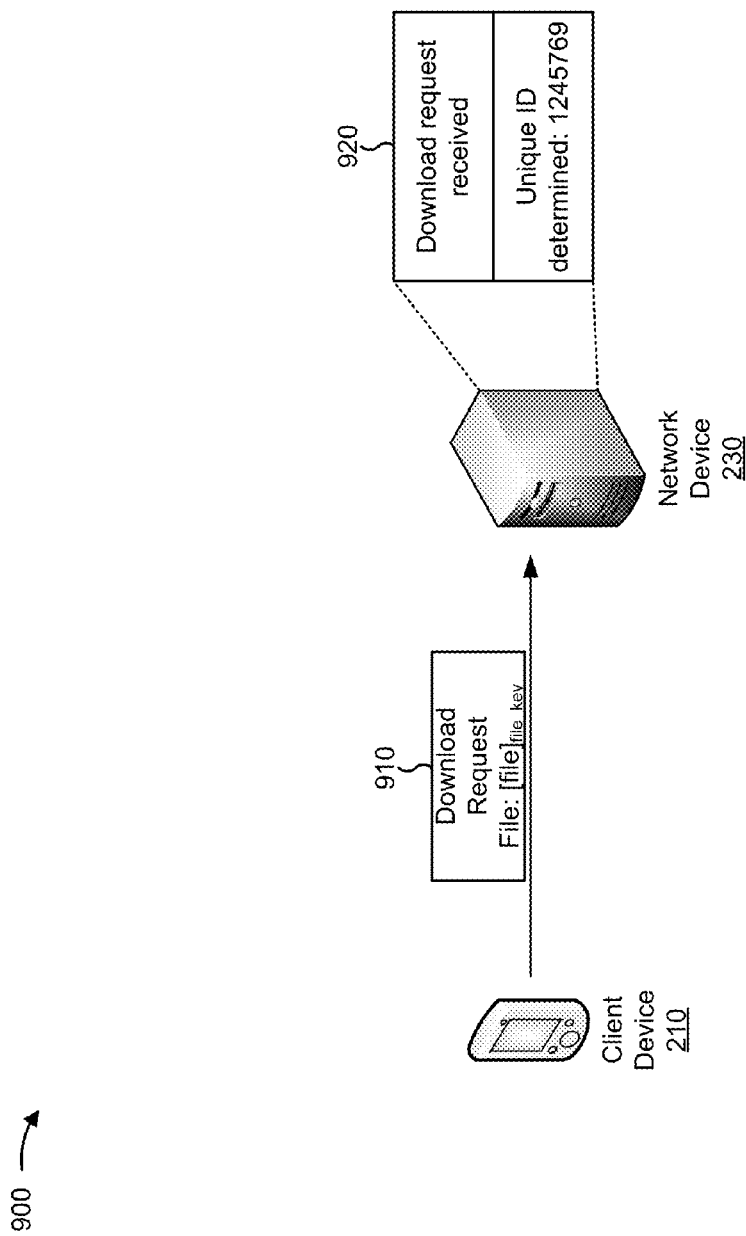
FIGS. 9A and 9B are diagrams of an example implementation relating to the example process shown in FIG. 8.
Figure 9B:
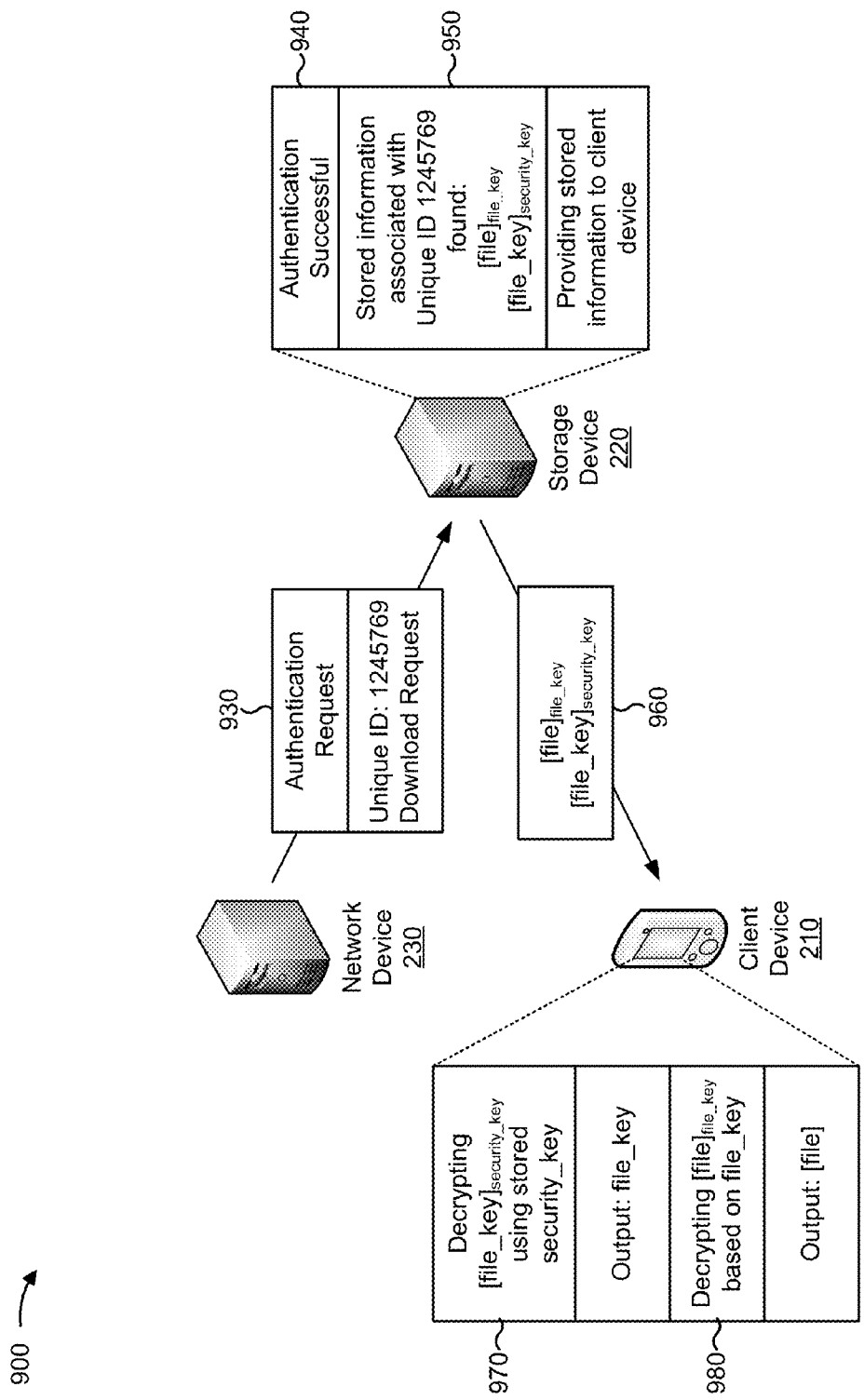

FIGS. 9A and 9B are diagrams of an example implementation 900 relating to example process 800 shown in FIG. 8. FIGS. 9A and 9B show an example of downloading and decrypting an encrypted file and a file key used to encrypt the file. For the purposes of FIGS. 9A and 9B, assume that the operations described herein in connection with FIGS. 5A-5C have been performed.

As shown in FIG. 9A, and by reference number 910, client device 210 may provide, to network device 230, a download request. As further shown, the download request may identify an encrypted file (e.g., [file]$_{file\_key}$). As shown by reference number 920, network device 230 may receive the download request. As further shown, network device 230 may determine a unique identifier associated with client device 210 (e.g., a Unique ID of 1245769).

As shown in FIG. 9B, and by reference number 930, network device 230 may provide, to storage device 220, an authentication request. As further shown, the authentication request may include the Unique ID of 1245769 and the download request. As shown by reference number 940, storage device 220 may successfully authenticate client device 210. As shown by reference number 950, storage device 220 may determine an encrypted file and a stored encrypted file key that are associated with the Unique ID of 1245769 (e.g., [file]$_{file\_key}$ and [file_key]$_{security\_key}$). As shown by reference number 960, storage device 220 may provide, to client device 210, the encrypted file and the encrypted file key.

As further shown in FIG. 9B, and by reference number 970, client device 210 may decrypt the encrypted file key. Assume that client device 210 decrypts the encrypted file key using a security key stored by client device 210. Client device 210 may decrypt the encrypted file key to recover a file key used by client device 210 to encrypt the file. As shown by reference number 980, client device 210 may decrypt the encrypted file, based on the file key that client device 210 decrypted using the security key, to recover a file.

In this way, client device 210 may decrypt an encrypted file key using a security key, and may decrypt an encrypted file using the file key to recover a file that was originally encrypted by client device 210. By generating the security key based on a unique identifier provided by network device 230, rather than a relatively insecure user-provided credential, client device 210 may improve security of the file.

As indicated above, FIGS. 9A and 9B are provided merely as an example. Other examples are possible and may differ from what was described with regard to FIGS. 9A and 9B.

In this way, client device 210 may improve security of the encrypted file, by generating a security key based on a network-provided unique identifier, rather than a user-provided password. Client device 210 may further improve security of the encrypted file by storing the security key and a file key on different devices, and by re-encrypting an encrypted file key periodically based on a new unique identifier.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information.

Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing instructions; and
   one or more processors to execute the instructions to:
      provide, by a first application associated with the device, an upload request to upload a file;
      receive, based on the upload request and based on an authentication of the device, a first unique identifier associated with the device;
      obtain a file key for encrypting the file;

generate a first security key for encrypting the file key using the first unique identifier;
encrypt the file, using the file key, to create an encrypted file;
encrypt the file key, using the first security key, to create a first encrypted file key;
provide, by the first application, the encrypted file and the first encrypted file key for storage by a storage device;
receive a second unique identifier associated with the device,
the second unique identifier being different than the first unique identifier;
generate a second security key based on the second unique identifier,
the second security key being different than the first security key;
receive the first encrypted file key;
decrypt, using the first security key, the first encrypted file key to recover the file key;
encrypt, using the second security key, the file key to create a second encrypted file key;
provide the second encrypted file key for storage by the storage device;
provide, by a second application associated with the device, a download request,
the second application being different than the first application;
obtain, by the second application and based on the download request, the encrypted file and the second encrypted file key;
decrypt the second encrypted file key, using the second security key, to recover the file key; and
decrypt the encrypted file, using the file key, to recover the file.

2. The device of claim 1, where the one or more processors, when providing the download request, are to:
provide the download request to a network device for authentication; and
where the one or more processors, when obtaining the encrypted file and the second encrypted file key, are to:
obtain the encrypted file and the second encrypted file key based on the download request being authenticated by the network device.

3. The device of claim 1, where the one or more processors are further to:
provide, to the storage device and in association with the encrypted file and the second encrypted file key, the second unique identifier; and
where the one or more processors, when obtaining the encrypted file and the second encrypted file key, are to:
obtain the encrypted file and the second encrypted file key based on the second unique identifier.

4. The device of claim 1, where the one or more processors, when providing the upload request, are to:
provide the upload request to a network device for determining the first unique identifier; and
where the one or more processors, when receiving the first unique identifier, are to:
receive the first unique identifier from the network device or the storage device.

5. The device of claim 1, where the one or more processors, when generating the first security key using the first unique identifier, are to:
generate the first security key by applying a hashing algorithm to the first unique identifier.

6. The device of claim 1, where the one or more processors are further to:
delete the first security key.

7. The device of claim 1, where the one or more processors, when providing the encrypted file, are to:
provide the encrypted file via a secure session.

8. A computer-readable medium storing instructions, the instructions comprising:
one or more instructions that, when executed by one or more processors, cause the one or more processors to:
provide, by a first application, an upload request to upload a file;
receive, based on the upload request and based on an authentication of a device, a first unique identifier associated with the device;
obtain a file key for encrypting the file;
generate a first security key for encrypting the file key using the first unique identifier;
encrypt the file, using the file key, to create an encrypted file;
encrypt the file key, using the first security key, to create a first encrypted file key;
provide, by the first application, the encrypted file and the first encrypted file key for storage by a storage device;
receive a second unique identifier associated with the device,
the second unique identifier being different than the first unique identifier;
generate a second security key based on the second unique identifier,
the second security key being different than the first security key;
receive the first encrypted file key;
decrypt, using the first security key, the first encrypted file key to recover the file key;
encrypt, using the second security key, the file key to create a second encrypted file key;
provide the second encrypted file key for storage by the storage device;
provide, by a second application, a download request,
the second application being different than the first application;
obtain, by the second application and based on the download request, the encrypted file and the second encrypted file key;
decrypt the second encrypted file key, using the second security key, to recover the file key; and
decrypt the encrypted file, using the file key, to recover the file.

9. The computer-readable medium of claim 8, where the one or more instructions, that cause the one or more processors to provide the download request, cause the one or more processors to:
provide the download request to a network device for authentication; and
where the one or more instructions, that cause the one or more processors to receive the encrypted file and the second encrypted file key, cause the one or more processors to:
receive the encrypted file and the second encrypted file key based on the authentication by the network device.

10. The computer-readable medium of claim 8, where the one or more instructions, when executed by the one or more processors, further cause the one or more processors to:

provide, to the storage device and in association with the encrypted file and the second encrypted file key, the second unique identifier; and where the one or more instructions, that cause the one or more processors to receive the encrypted file and the second encrypted file key, cause the one or more processors to:

receive the encrypted file and the second encrypted file key based on the second unique identifier.

11. The computer-readable medium of claim 8, where the one or more instructions, that cause the one or more processors to provide the upload request, cause the one or more processors to:

provide the upload request to a network device for determining the first unique identifier; and where the one or more instructions, that cause the one or more processors to receive the first unique identifier, cause the one or more processors to:

receive the first unique identifier from the network device or the storage device.

12. The computer-readable medium of claim 8, where the first unique identifier is not received based on a failure to authenticate the device.

13. The computer-readable medium of claim 8, where the one or more instructions, that cause the one or more processors to provide the first encrypted file key, cause the one or more processors to:

provide the first encrypted file key via a secure session.

14. The computer-readable medium of claim 8, where the one or more instructions, when executed by the one or more processors, further cause the one or more processors to:

delete the file key based on encrypting the file key.

15. A method, comprising:

providing, by a first application associated with a device, an upload request to upload a file;

receiving, by the device and based on the upload request and an authentication of the device, a first unique identifier associated with the device;

obtaining, by the device, a file key for encrypting the file;

generating, by the device, a first security key for encrypting the file key using the first unique identifier;

encrypting the file, by the device and using the file key, to create an encrypted file;

encrypting the file key, by the device and using the first security key, to create a first encrypted file key;

outputting, by the first application associated with the device, the encrypted file and the first encrypted file key;

receiving, by the device, a second unique identifier associated with the device, the second unique identifier being different than the first unique identifier;

generating, by the device, a second security key based on the second unique identifier, the second security key being different than the first security key;

receiving, by the device, the first encrypted file key;

decrypting, by the device and using the first security key, the first encrypted file key to recover the file key;

encrypting, by the device and using the second security key, the file key to create a second encrypted file key;

outputting, by the device, the second encrypted file keys;

providing, by a second application associated with the device, a download request, the second application being different than the first application;

obtaining, by the second application and based on the download request, the encrypted file and the second encrypted file key;

decrypting, by the device, the second encrypted file key, using the second security key, to recover the file key; and decrypting, by the device, the encrypted file, using the file key, to recover the file.

16. The method of claim 15, where providing the download request comprises:

providing the download request to a network device for authentication; and where receiving the encrypted file and the second encrypted file key comprises:

receiving the encrypted file and the second encrypted file key based on the download request being authenticated by the network device.

17. The method of claim 15, where providing the upload request comprises:

providing the upload request to a network device for determining the first unique identifier; and where receiving the first unique identifier comprises:

receiving the first unique identifier from the network device or a storage device, the network device being different than the storage device.

18. The method of claim 15, further comprising:

deleting the file key based on outputting the first encrypted file key.

19. The method of claim 15, where providing the second encrypted file key comprising:

providing the second encrypted file key via a secure session.

20. The method of claim 15, further comprising:

deleting the file key from a memory based on encrypting the file key.

* * * * *